United States Patent [19]

Bättig

[11] Patent Number: 5,052,825
[45] Date of Patent: Oct. 1, 1991

[54] AXIAL MOUNTING WITH SKEWING COMPENSATION

[75] Inventor: Josef Bättig, Othmarsingen, Switzerland

[73] Assignee: Asea Brown Boveri Ltd., Baden, Switzerland

[21] Appl. No.: 432,734

[22] PCT Filed: Mar. 22, 1989

[86] PCT No.: PCT/CH89/00058

§ 371 Date: Oct. 30, 1989

§ 102(e) Date: Oct. 30, 1989

[87] PCT Pub. No.: WO89/09345

PCT Pub. Date: Oct. 5, 1989

[30] Foreign Application Priority Data

Mar. 25, 1988 [CH] Switzerland .................. 1147/88

[51] Int. Cl.$^5$ ............................................. F16C 23/04
[52] U.S. Cl. ..................................... 384/223; 384/441
[58] Field of Search ............... 384/223, 215, 224, 220, 384/420, 441

[56] References Cited

U.S. PATENT DOCUMENTS 2,777,739  1/1957  Beerli .
3,049,860  8/1962  Beerli .
3,131,003  4/1964  Glaser .

FOREIGN PATENT DOCUMENTS 2046118  3/1971  France .
2279141  2/1976  France .

Primary Examiner—Lenard A. Footland
Attorney, Agent, or Firm—Oblon, Spivak, McClelland, Maier & Neustadt

[57] ABSTRACT

The axial mounting with skewing compensation for a turbomachine has a fastening flange (1) and a bearing housing (2) which is in one piece with the latter and which is subdivided into a middle housing part (9) and an outer housing part (10) by means of at least one pair of slots (4,7) in two respective planes. The slots (4,7) are widened in a lobe-like manner at their ends, and these ends respectively limit at least one pair of webs (5,8) located diametrically opposite one another in the said planes. These webs (5,8) perform the function of rigid joints for damping angular deflections of the shaft which are caused by operating loads. The webs (5,8) of the two planes are offset relative to one another by 90°, generally by the amount of half their circumferential division.

16 Claims, 2 Drawing Sheets

AXIAL MOUNTING WITH SKEWING COMPENSATION

BACKGROUND OF THE INVENTION

The present invention relates to an axial mounting with skewing compensation, with a bearing housing for receiving a radial plain bearing and axial bearing segments and with a fastening flange for fastening the bearing housing in the shaft housing of a rotating machine.

FIELD OF THE INVENTION

On high-speed turbomachines with operating loads acting axially, these are absorbed by an axial bearing which is usually arranged in a common housing with one of the radial bearings. As a result of the operating loads, that is to say rotor unbalances and/or tilting movements attributable to a gyroscopic effect as a result of changes in the direction of vehicles or even because of production-related inaccuracies in the mountings, a skewing of the shaft and therefore of the bearing holder of the axial bearing can occur. As an example of this, mention may be made of large turbochargers of ship diesel engines, in which the high mass moments of inertia of the turbocharger rotors generate considerable gyroscopic moments in the event of changes in the direction of travel, and this leads to a one-sided loading and wearing of the axial bearing and, as a result of edge pressure, also of the radial bearing accommodated in a common bearing housing with the axial bearing, insofar as this radial bearing is a plain bearing.

DISCUSSION OF BACKGROUND

In a known bearing device with skewing compensation for a turbocharger engine, a bearing housing receiving the plain bearing and the stationary thrust ring of the axial bearing is equipped with a flange, the circumference of which is designed as a rigid ring connected to the hub part receiving the bearing elements by means of a disk which is thin-walled in relation to the said ring and which, under pronounced bearing loads, damps shocks on the axial and plain bearings as a result of its elastic flexibility and prevents a one-sided wearing of their sliding surfaces. However, as stated, the said disk is "thin-walled" only in relation to the circumference of the flange which is designed as a rigid thick-walled ring for fastening the bearing housing to the shaft housing of the turbocharger. But in absolute terms, the disk must nevertheless be rigid enough to ensure that its deformation does not exceed a specific permissible value.

Such dimensioning alone, without means for limiting the permissible deformations, does not offer any guarantee that these will be adhered to. In a further development of such a mounting for a turbocharger, therefore, the abovementioned disk connecting the rigid flange ring to the hub part of the bearing housing is made relatively thin and virtually in the form of a rigid diaphragm which is therefore more easily deformable by means of loads acting on the shaft, but the deformation of which is limited to a specific permissible value by a very rigid intermediate flange deformable virtually negligibly by the operating loads. This intermediate flange is clamped between the shaft housing and the diaphragm flange of the bearing housing, and its inner circumferential part serves as a stop for a ring part on the inner circumference of the diaphragm flange, there being, in the non-loaded state, between the annular end face of this ring part and the intermediate flange an axial play, for example 1 mm, which determines the maximum deformability of the diaphragm flange, for example as a result of the tilting of the bearing sliding surface of the axial bearing and of the plain bearing. When maximum deformation occurs, the end face of the abovementioned ring part on the inner circumference of the diaphragm flange comes to bear against the adjacent circumferential part of the intermediate flange, and this, under a load travelling over the bearing circumference, for example unbalances, leads to a sliding friction located at certain points and travelling over the entire circumference of the annular surfaces sliding on one another and, in the course of time, to an increase in the play between these. Under high loads, this then sooner or later leads to deformations of the shaft more pronounced than those permissible and consequently to increased wear of the bearing elements.

FR-A-2,279,141 has made known a bearing body in the form of a coupling, of which the flexibility in relation to skewing compensation is provided by a body made of a medium-hard elastomer. Now if this bearing body is to be highly elastic for the purpose of good shock absorption, then a high axial flexibility must be provided, this also being embodied by the slots extending radially in the plane. It must be said, furthermore, that the flexible body is subjected to full torsional stress, this quickly leading to fatigue phenomena.

SUMMARY OF THE INVENTION

Accordingly, one object of this invention is to avoid the abovementioned disadvantages of the known versions in an axial mounting for the uses mentioned in the introduction. That is to say, the mounting must be both sufficiently elastic to allow the permissible deformations and wear-free to prevent excessive deformations.

The axial mounting according to the invention is defined in that the bearing housing is subdivided into a middle housing part adjacent to the said flange and into an outer housing part by means of slots interrupted on the circumference and located in two planes, normal relative to the bearing axis, in that the ends of the slots are widened in the axis-parallel direction, in such a way that they respectively limit at least one pair of webs located diametrically opposite one another, and in that the webs of the one plane are offset relative to the webs of the second plane by half the angular distance between two webs located in the same plane and adjacent to one another.

The invention is described in detail below by reference to two exemplary embodiments illustrated in the drawing.

BRIEF DESCRIPTION OF THE DRAWINGS

A more complete appreciation of the invention and many attendant advantages thereof will be readily obtained as the same becomes better understood by reference to the following detailed description when considered in connection with the accompanying drawings wherein.

DESCRIPTION OF THE PREFERRED EMBODIMENTS

Figure 1:
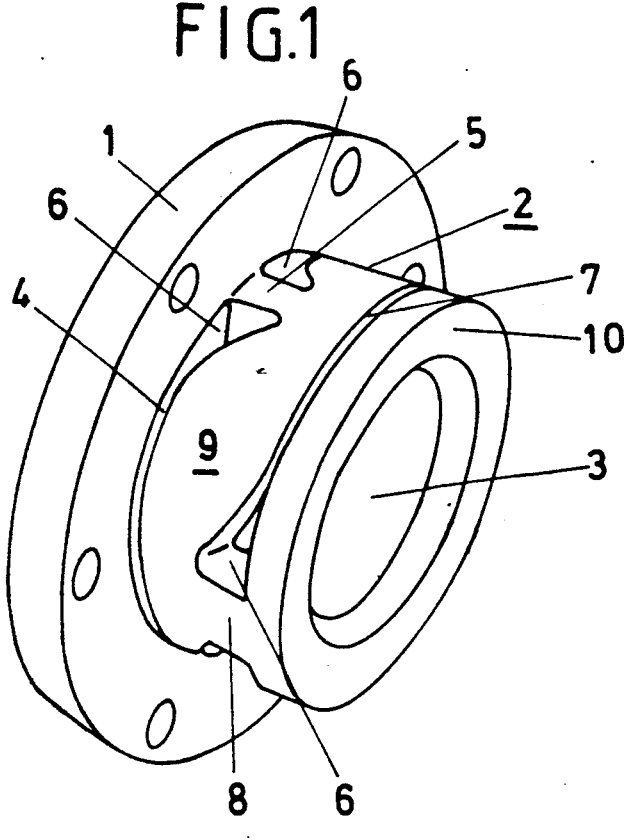
FIG. 1 shows an axonometric view of a first embodiment of the subject of the invention.

Referring now to the drawings, wherein the reference numerals designate identical or corresponding parts throughout the several views, in FIG. 1, 1 denotes a fastening flange which is in one piece with a bearing housing 2. The flange 1 serves for fastening the bearing housing 2, for example inside a shaft housing of an exhaust-gas turbocharger, specifically on the compressor side, towards which the axial thrust of the turbine is directed. A bore 3 serves for receiving a bearing bush (not shown) which is secured in the bore 3 by means of a shrink fit and which is intended for receiving a plain bearing and, on its end face, an axial bearing of a known type.

The requisite flexibility of the mounting under the effect of the operating loads, that is to say a specific angular deflection of the housing 2 possible in all directions, is obtained by means of slots in the housing 2 which extend in two parallel planes and which allow a quasi cardanic movability of the housing 2 relative to the flange 1 connected firmly to the shaft housing. Immediately adjacent to the flange 1 there are two slots 4 which are located radially opposite one another and the two ends of which terminate respectively at a web 5 on the circumference of the housing 2. The slot ends 6 have the form of lobe-like widenings, with the result that the webs 5 acquire an axial extension of a length which, under the operating loads to be expected, allows the housing 2 to bend about an axis passing through the two webs located opposite one another.

The webs 5 are dimensioned for fatigue strength in terms of moment of resistance and axial load.

Two slots 7 offset by 90° relative to the slots 4 and having the same dimensions and the same form limit two webs 8 likewise located diametrically opposite one another. The slots 7 divide the bearing housing 2 into a middle housing part 9 and an outer housing part 10. The latter serves for receiving a bearing sleeve (not shown) which has a plain-bearing bush and race segments of known type for the axial bearing. This bearing sleeve is shrunk into the bore 3, the shrink fit extending only over the region of the outer housing part 10, but limiting with the bore in the middle housing part 9 an annular space for the supply of lubricating oil to the bearing sliding surfaces.

The webs 5 and 8 form joints which participate in the full skewing of the axial bearing, without the housing parts 9 and 10 at the same time being subjected to any appreciable deformation.

Figure 4:
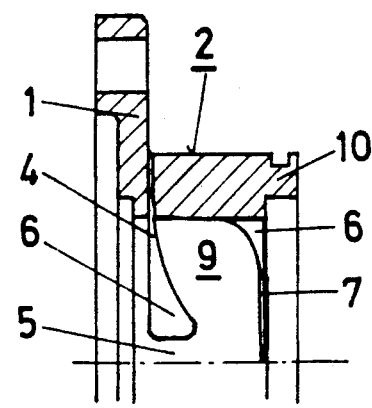
FIG. 4 shows an axial section along the sectional plane IV—IV marked in the upper half of FIG. 3.
Figure 2:
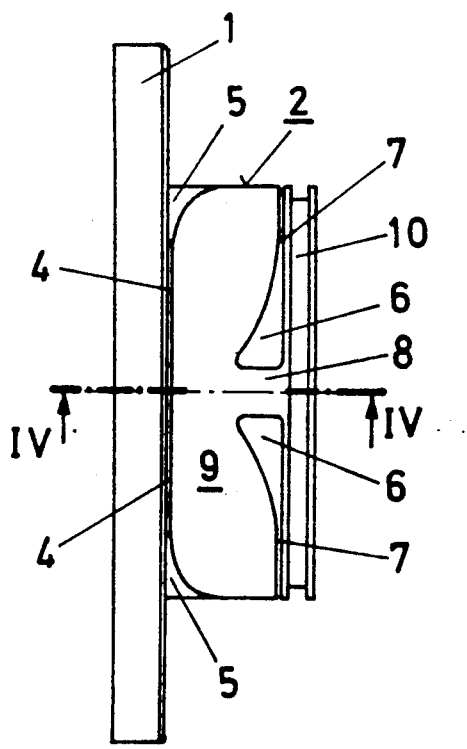
FIGS. 2 and 3 show two views of the first embodiment in two directions of projection perpendicular relative to one another.
Figure 3:
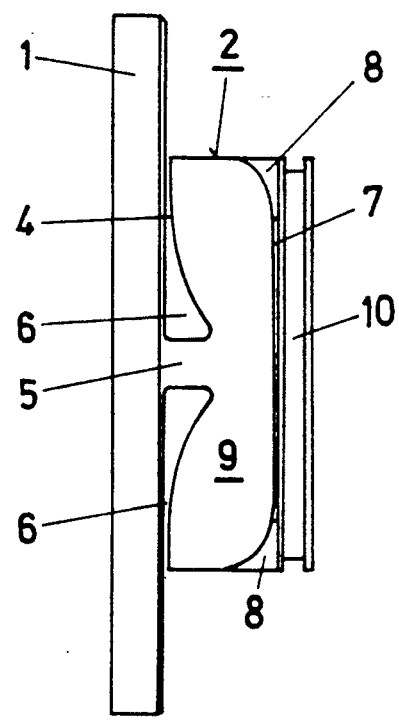

FIGS. 2 and 3 show two views of a design according to FIG. 1, as seen in two directions of projection offset by 90° relative to one another. In this design, the outer housing part is equipped with an annular groove of rectangular cross-section for receiving a sealing ring. FIG. 4 shows the upper half of this design in an axial section IV—IV; see FIG. 2.

Figure 5:
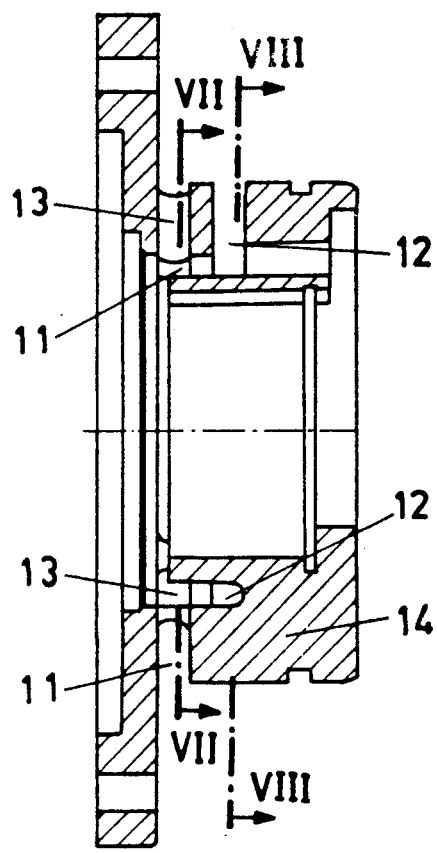
FIGS. 5 and 6 show respectively an axial section through and a side view of a second embodiment.
Figure 6:
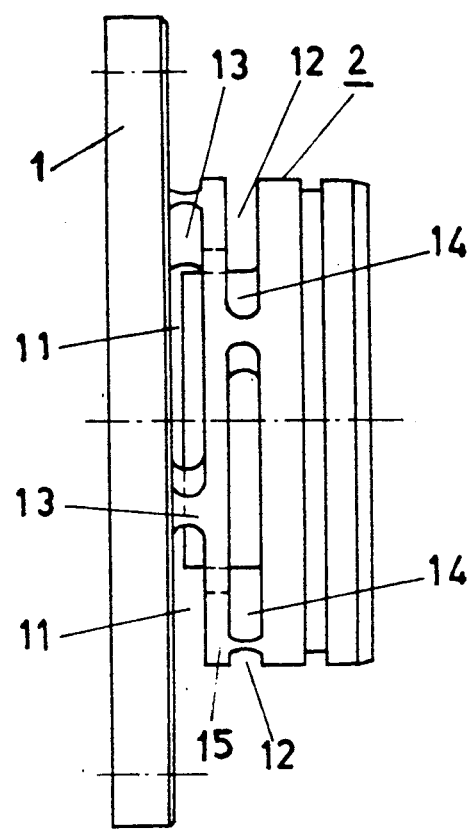
Figure 7:
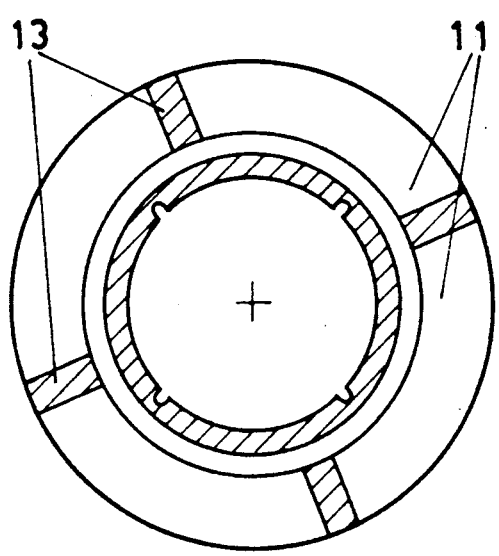
FIGS. 7 and 8 show two cross-sections through this embodiment along the sectional lines VII—VII and VIII—VIII marked in FIG. 5.
Figure 8:
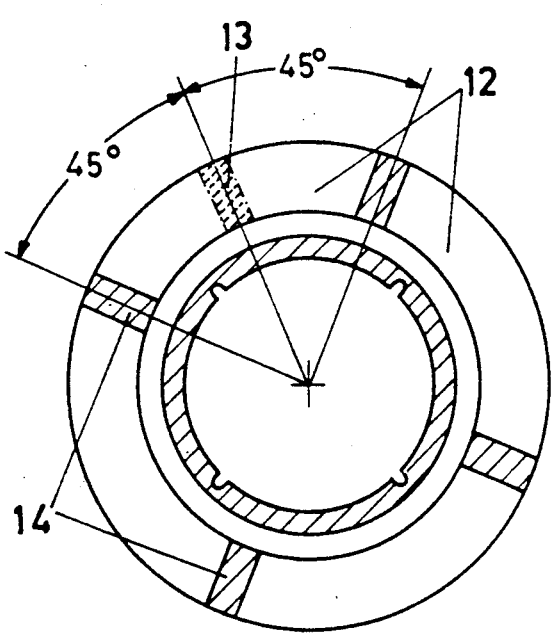

With larger and heavier rotors and therefore bearings which are subjected to a higher load and in which the support of the axial bearing segments located between the webs 5 and 8 is not sufficient to prevent an inadmissible deformation of these, the alternative version illustrated in FIGS. 5 to 8 can be used. Its construction differs from the version with two webs 5 and 8 in the two respective slots 4 and 7 in that, for the four slots 11 and 12, there are four respective webs 13 and 14 in the slot planes. FIGS. 7 and 8, which correspond to the sectional lines VII—VII, VIII—VIII marked in FIG. 5, show that the webs 13 between the slots 11 are offset by 45° in the circumferential direction relative to the webs 14 between the slots 12. In FIG. 8, the contour of a web 13 from FIG. 7, showing the angular relationship with the webs 14, is represented by dot-and-dash lines.

The following explanatory statement will now be made:

In this so-called "4-point version", the support therefore takes place at each force introduction point of a 4-segment axial bearing. Here, therefore, the force flux is guided by 4 supports to an elastic spring ring 15 and from this in turn to the four supports on the fastening flange 1 which have already been assessed above and which are offset by 45°. This solution requires less constructional space in comparison with the cardanic version and, in comparison with a diaphragm solution, as mentioned previously under the state of the art, has a skewing behavior better by approximately the factor 2, whilst possessing the same axial flexibility. This 4-point support also works free of wear and is eminently suitable to be exchangeable for current mountings. In this respect, it is necessary to ensure that the intermediate ring 15 is subjected only to bending stress, this being possible insofar as an axial design is provided for the purpose of a minimum axial compression.

Obviously, numerous modifications and variations of the present invention are possible in the light of the above teachings. It is therefore to be understood that, within the scope of the appended claims, the invention may be practiced otherwise than as specifically described herein.

What is claimed as new and desired to be secured by letters patent of the United States is:

1. An axial mounting with skewing compensation, comprising:
   a bearing housing for receiving a radial plain bearing and axial bearing segments;
   a fastening flange for fastening the bearing housing in the shaft housing of a rotating machine, wherein the bearing housing is subdivided into a middle housing part adjacent to said flange and into an outer housing part by means of slots interrupted on the circumference and located in two planes, normal relative to the bearing axis, wherein the ends of the slots are widened in the axis-parallel direction, in such a way that they respectively limit at least one pair of webs located diametrically opposite one another, and wherein the webs of a first of said two planes are offset relative to the webs of a second of said two planes by half the angular distance between two webs located in the same plane and adjacent to one another.

2. An axial mounting as claimed in claim 1, wherein in each of said first and second planes there is a respective pair of webs which are offset by 90° relative to one another in the circumferential direction.

3. An axial mounting as claimed in claim 1, wherein in each of said first and second planes there are two respective pairs of webs which are offset by 45° in the circumferential direction relative to the webs of the other particular plane.

4. An axial mounting with skewing compensation, comprising:
- a bearing housing including a middle housing part and an outer housing part, said outer housing part being adapted to receive a radial plain bearing and axial bearing segments;
- a fastening flange for fastening the bearing housing in the shaft housing of a rotating machine;
- a first set of circumferentially extending slots separating said middle housing apart from said fastening flange; and
- a second set of circumferentially extending slots separating said outer housing part from said middle housing part;
- wherein each of said slots terminates at a slot end, and wherein each of said slots is spaced from an adjacent slot by a web.

5. The axial mounting according to claim 4, wherein each of said slot ends is widened in a direction parallel to the axial direction of the bearing housing.

6. The axial mounting according to claim 4, wherein each of said slot ends is spaced from another slot end by a web.

7. The axial mounting according to claim 5, wherein each of said slot ends is spaced from the slot end of an adjacent slot by a web.

8. The axial mounting according to claim 4, wherein each of said webs is dimensioned for fatigue strength in terms of moment of resistance and axial load.

9. The axial mounting according to claim 4, wherein no plane perpendicular to the axis of the bearing housing passes through said first set of circumferentially extending slots and through said second set of circumferentially extending slots.

10. The axial mounting according to claim 4, wherein said outer housing part is an endless collar receiving a bearing bush by means of a shrink fit.

11. The axial mounting according to claim 4, wherein said middle housing part is joined to said fastening flange by a first set of webs passing substantially perpendicular to said first set of circumferentially extending slots.

12. The axial mounting according to claim 11, wherein said outer housing part is joined to said middle housing part by a second set of webs passing substantially perpendicular to said second set of circumferentially extending slots.

13. The axial mounting according to claim 12, wherein webs in said first set of webs are spaced from one another by an angular distance of 180°.

14. The axial mounting according to claim 13, wherein webs in said second set of webs are spaced from one another by an angular distance of 180° and wherein each web in said second set is offset from a web in said first set by an angular distance of 90°.

15. The axial mounting according to claim 12, wherein webs in said first set of webs are spaced from one another by an angular distance of 90°.

16. The axial mounting according to claim 13, wherein webs in said second set of webs are spaced from one another by an angular distance of 90° and wherein each web in said second set is offset from a web in said first set by an angular distance of 45°.

* * * * *